US012786361B2

(12) United States Patent
Chien et al.

(10) Patent No.: US 12,786,361 B2
(45) Date of Patent: Nov. 3, 2026

(54) METHOD FOR AUTOMATICALLY DETECTING PROJECTOR CONFIGURATION AND PROJECTION SYSTEM

(71) Applicant: Coretronic Corporation, Hsin-Chu (TW)

(72) Inventors: Chun-Lin Chien, Hsin-Chu (TW); Chung-Lung Yang, Hsin-Chu (TW); Yu-Wen Lo, Hsin-Chu (TW); Xuan-En Fung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 234 days.

(21) Appl. No.: 18/531,699

(22) Filed: Dec. 7, 2023

(65) Prior Publication Data

US 2024/0195945 A1 Jun. 13, 2024

(30) Foreign Application Priority Data

Dec. 8, 2022 (TW) .................................. 111147125

(51) Int. Cl.
*H04N 9/31* (2006.01)

(52) U.S. Cl.
CPC ................................. *H04N 9/3147* (2013.01)

(58) Field of Classification Search
CPC ............... H04N 9/3147; H04N 9/3194; H04N 9/3135
See application file for complete search history.

(56) References Cited

U.S. PATENT DOCUMENTS 6,222,593 B1 4/2001 Higurashi et al.
6,377,306 B1 4/2002 Johnson et al.
(Continued)

FOREIGN PATENT DOCUMENTS

CN 102170544 8/2011
CN 102170545 8/2011
(Continued)

OTHER PUBLICATIONS

"Office Action of United Kingdom Counterpart Application", issued on Sep. 11, 2024, pp. 1-9.
(Continued)

*Primary Examiner* — Michael E Teitelbaum
(74) *Attorney, Agent, or Firm* — JCIPRNET

(57) ABSTRACT

A method for automatically detecting a projector configuration and a projection system are provided. First, multiple projectors are searched in a network domain, and each projector is correspondingly equipped with an imaging apparatus. Next, the projectors are driven to project, and the imaging apparatuses are driven to capture images. Afterwards, the projectors are grouped based on one or more projected ranges comprised in an imaging range of the imaging apparatus corresponding to each projector. A configuration relationship of the projected ranges of the projectors in the same group is determined for overlapping areas between the projected ranges of the projectors grouped in the same group. The method for automatically detecting the projector configuration and the projection system proposed by the disclosure can automatically detect the actual configuration relationship of the projectors.

20 Claims, 16 Drawing Sheets

(56) References Cited

U.S. PATENT DOCUMENTS

| | | | |
|---|---|---|---|
| 6,456,339 B1 | 9/2002 | Surati et al. | |
| 8,454,171 B2 | 6/2013 | Ivashin | |
| 9,955,149 B2 | 4/2018 | Kilcher et al. | |
| 10,080,002 B2 | 9/2018 | Kasuga et al. | |
| 10,681,319 B2 * | 6/2020 | Oike | H04N 9/315 |
| 10,771,751 B2 | 9/2020 | Hiranuma | |
| 2002/0008697 A1 | 1/2002 | Deering | |
| 2003/0156262 A1 | 8/2003 | Baker et al. | |
| 2004/0184011 A1 | 9/2004 | Raskar et al. | |
| 2004/0227908 A1 | 11/2004 | Wada et al. | |
| 2005/0128196 A1 | 6/2005 | Popescu et al. | |
| 2007/0279522 A1 | 12/2007 | Gilg et al. | |
| 2009/0279055 A1 | 11/2009 | Amano | |
| 2010/0053569 A1 | 3/2010 | Furui | |
| 2010/0111441 A1 | 5/2010 | Xiong et al. | |
| 2011/0007172 A1 | 1/2011 | Miceli | |
| 2012/0313974 A1 | 12/2012 | Ueno et al. | |
| 2013/0113975 A1 | 5/2013 | Gabris | |
| 2013/0169888 A1 | 7/2013 | Tannhauser et al. | |
| 2017/0134702 A1 | 5/2017 | Hashi | |
| 2017/0212719 A1 | 7/2017 | Fujimori | |
| 2017/0295349 A1 | 10/2017 | Kasuga et al. | |
| 2017/0310938 A1 | 10/2017 | Okamura | |
| 2018/0192015 A1 | 7/2018 | Wang et al. | |
| 2019/0087946 A1 | 3/2019 | Chiba | |
| 2019/0104289 A1 | 4/2019 | Lin et al. | |
| 2019/0104290 A1 | 4/2019 | Lin et al. | |
| 2019/0121224 A1 | 4/2019 | Edwards et al. | |
| 2022/0345672 A1 | 10/2022 | Lai | |
| 2024/0089418 A1 * | 3/2024 | Post | H04N 9/3147 |

FOREIGN PATENT DOCUMENTS

| | | |
|---|---|---|
| CN | 103841343 | 6/2014 |
| CN | 104427280 | 3/2015 |
| CN | 104853127 | 8/2015 |
| CN | 104980722 | 10/2015 |
| CN | 105308503 | 2/2016 |
| CN | 105376540 | 3/2016 |
| CN | 106993172 | 7/2017 |
| CN | 109587458 | 10/2021 |
| TW | 337001 | 7/1998 |
| TW | 200630735 | 9/2006 |
| TW | I454147 | 9/2014 |
| TW | 201633277 | 9/2016 |
| TW | I592020 | 7/2017 |
| TW | I724746 | 4/2021 |

OTHER PUBLICATIONS

"Office Action of Taiwan Counterpart Application", issued on Jan. 25, 2024, p. 1-p. 4.

* cited by examiner

1201

| Number | Network address |
|---|---|
| 001 | 192.168.0.11 |
| 002 | 192.168.0.12 |
| 003 | 192.168.0.13 |
| 004 | 192.168.0.14 |
| 005 | 192.168.0.15 |
| 006 | 192.168.0.16 |
| 007 | 192.168.0.17 |
| 008 | 192.168.0.18 |
| 009 | 192.168.0.19 |
| 010 | 192.168.0.20 |
| 011 | 192.168.0.21 |

1211

| Number | Network address |
|---|---|
| 001 | 192.168.0.11 |
| 002 | 192.168.0.12 |
| 003 | 192.168.0.13 |

1212

| Number | Network address |
|---|---|
| 004 | 192.168.0.14 |
| 005 | 192.168.0.15 |

1213

| Number | Network address |
|---|---|
| 006 | 192.168.0.16 |
| 007 | 192.168.0.17 |

1214

| Number | Network address |
|---|---|
| 008 | 192.168.0.18 |
| 009 | 192.168.0.19 |
| 010 | 192.168.0.20 |
| 011 | 192.168.0.21 |

FIG. 12

METHOD FOR AUTOMATICALLY DETECTING PROJECTOR CONFIGURATION AND PROJECTION SYSTEM

CROSS-REFERENCE TO RELATED APPLICATION

This application claims the priority benefit of Taiwan application serial no. 111147125, filed on Dec. 8, 2022. The entirety of the above-mentioned patent application is hereby incorporated by reference herein and made a part of this specification.

BACKGROUND

Technical Field

The disclosure relates to a projector configuration method, and in particular to a method for automatically detecting a projector configuration and a projection system.

Description of Related Art

Generally speaking, in the multi-projectors, the projectors are mostly managed using applications. The grouping manner of each projector group needs to be manually configured. For example, in a projector list, which projectors should be set as the same group are manually selected. After completing the projector group, applications of multi-machine settings, such as a splicing application is completed. Accordingly, only manual grouping can be used for the current method, and only one group can be set at a time, which is not efficient. In addition, manual grouping requires personnel to arrive at the place where the projectors are set, otherwise the position configuration of the projectors cannot be easily set.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a method for automatically detecting a projector configuration and a projection system, which can automatically detect an actual configuration relationship of projectors.

Other objectives and advantages of the disclosure can be further understood from the technical features disclosed in the disclosure.

In order to achieve one, a part, or all of the above objectives or other objectives, a method for automatically detecting a projector configuration of the disclosure includes the following steps. Multiple projectors are searched in a network domain. Each projector is correspondingly equipped with an imaging apparatus. The projectors are driven to project, and the imaging apparatuses are driven to capture images. The projectors are grouped based on one or more projected ranges included in an imaging range of the imaging apparatus of each projector. A configuration relationship of the projected ranges of the projectors in a same group is determined for overlapping areas between the projected ranges of the projectors grouped in the same group.

The projection system of the disclosure includes multiple projectors, multiple imaging apparatuses, and a processor. The projectors are disposed in a network domain. Each projector is correspondingly equipped with an imaging apparatus. The processor is coupled to the projector and the imaging apparatus, and is configured to perform the following. The projectors are searched in the network domain. The projectors are driven to project, and the imaging apparatuses are driven to capture images. The projectors are grouped based on one or more projected ranges included in an imaging range of the imaging apparatus of each projector. A configuration relationship of the projected ranges of the projectors in a same group is determined for overlapping areas between the projected ranges of the projectors grouped in the same group.

Based on the above, through automatic group pairing, the disclosure can automatically achieve the grouping of the projectors at the remote end and automatically detect the configuration relationship thereof, which improves the operating experience of a user.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 12 is a schematic diagram of a projector grouping result according to an embodiment of the disclosure.

DETAILED DESCRIPTION OF DISCLOSED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The aforementioned and other technical contents, features, and effects of the disclosure will be clearly presented in the following detailed description of a preferred embodiment with reference to the drawings. Directional terms, such as up, down, left, right, front, and back, mentioned in the following embodiments are only directions with reference to the drawings. Therefore, the directional terms are used to illustrate but not to limit the disclosure.

Figure 1A:
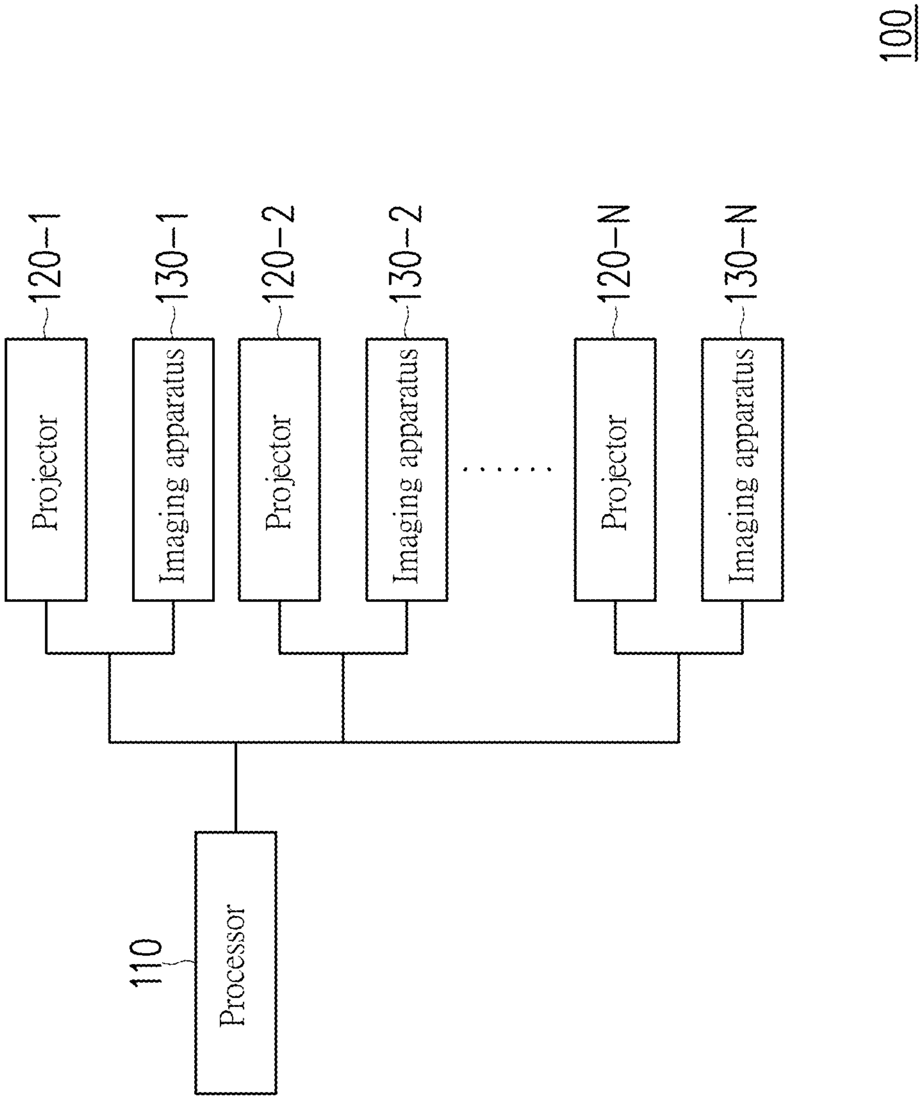
FIG. 1A is a block diagram of a projection system according to an embodiment of the disclosure.

FIG. 1A is a block diagram of a projection system according to an embodiment of the disclosure. Please refer to FIG. 1A. A projection system 100 includes a processor 110, multiple projectors 120-1 to 120-N, and multiple imaging apparatuses 130-1 to 130-N. Each projector is correspondingly equipped with one imaging apparatus, and the imaging apparatus is, for example, integrated in the projector or is externally connected to the projector, that is, the projector 120-1 is correspondingly equipped with the imaging apparatus 130-1, the projector 120-2 is equipped with the imaging apparatus 130-2, and so on.

The processor 110 is coupled to the projectors 120-1 to 120-N and the imaging apparatuses 130-1 to 130-N, and is used to control operations of the projectors 120-1 to 120-N and the imaging apparatuses 130-1 to 130-N. The processor 110 is, for example, a central processing unit (CPU), a physical processing unit (PPU), a programmable microprocessor, an embedded control chip, a digital signal processor (DSP), an application specific integrated circuit (ASIC), or other similar apparatuses.

In the embodiment, it is assumed that the projectors 120-1 to 120-N are disposed in the same network domain. After searching the projectors 120-1 to 120-N located in the same network domain, the processor 110 can detect a configuration relationship thereof through a method for automatically detecting a projector configuration described later.

Figure 1B:
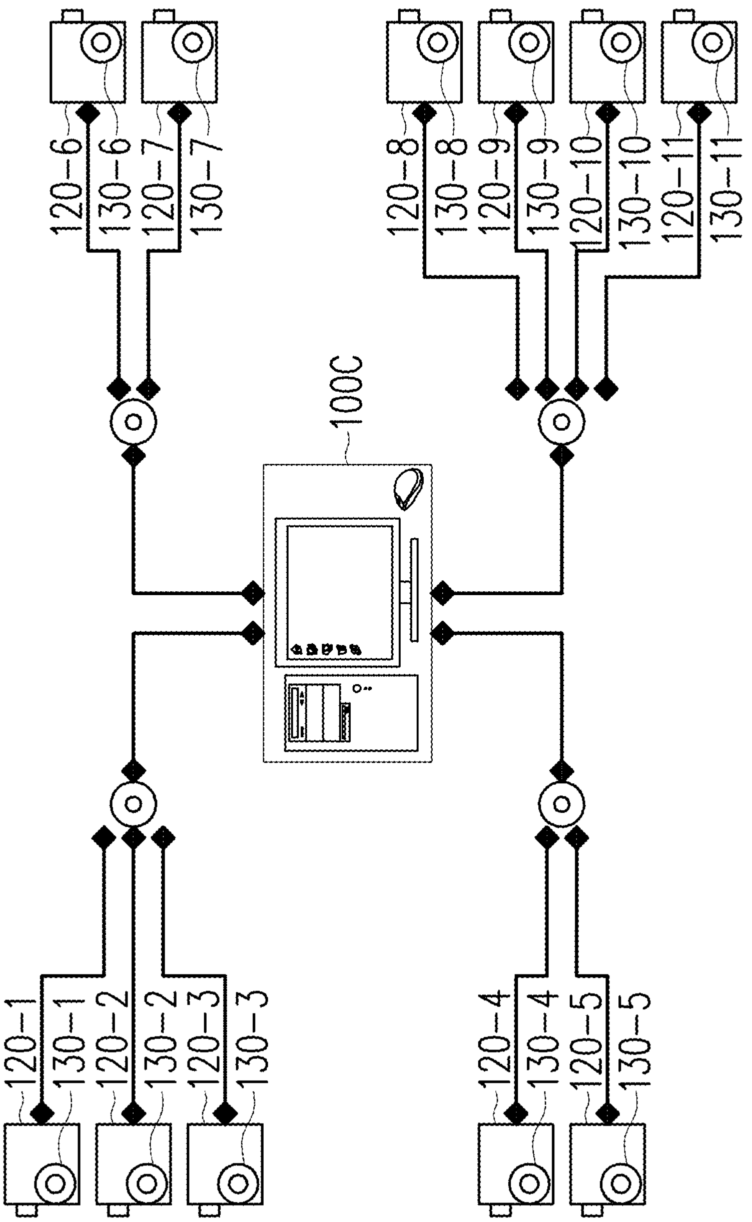
FIG. 1B is an architecture diagram of a projection system according to an embodiment of the disclosure.

In an embodiment, a central control apparatus 100C (an electronic apparatus having computing and networking functions, such as a computer or a mobile device) may be disposed in the projection system 100, as shown in FIG. 1B. FIG. 1B is an architecture diagram of a projection system according to an embodiment of the disclosure. Please refer to FIG. 1B. The central control apparatus 100C is configured with hardware components such as the processor 110, a storage apparatus, and a communication element. In the embodiment, the projectors 120-1 to 120-11 are used as an example for illustration. The configuration of the projectors 120-1 to 120-11 is detected through the central control apparatus 100C.

The storage apparatus includes one or more code fragments. After installing the code fragments, the code fragments are executed by the processor 110 to implement the method for automatically detecting the projector configuration described later. The storage apparatus may adopt any type of fixed or removable random access memory (RAM), read-only memory (ROM), flash memory, hard disk, other similar apparatuses, or a combination of the apparatuses.

The communication component is used to connect to a network to search the projectors 120-1 to 120-N in the same network domain. The communication element may be a chip or a circuit adopting local area network (LAN) technology, wireless LAN (WLAN) technology, or mobile communication technology. A local area network is, for example, Ethernet. A wireless local area network is, for example, Wi-Fi. The mobile communication technology is, for example, global system for mobile communications (GSM), third-generation (3G) mobile communication technology, fourth-generation (4G) mobile communication technology, fifth-generation (5G) mobile communication technology, etc.

In another embodiment, the processor 110 may also be disposed in any one of the projectors 120-1 to 120-N.

Figure 2:
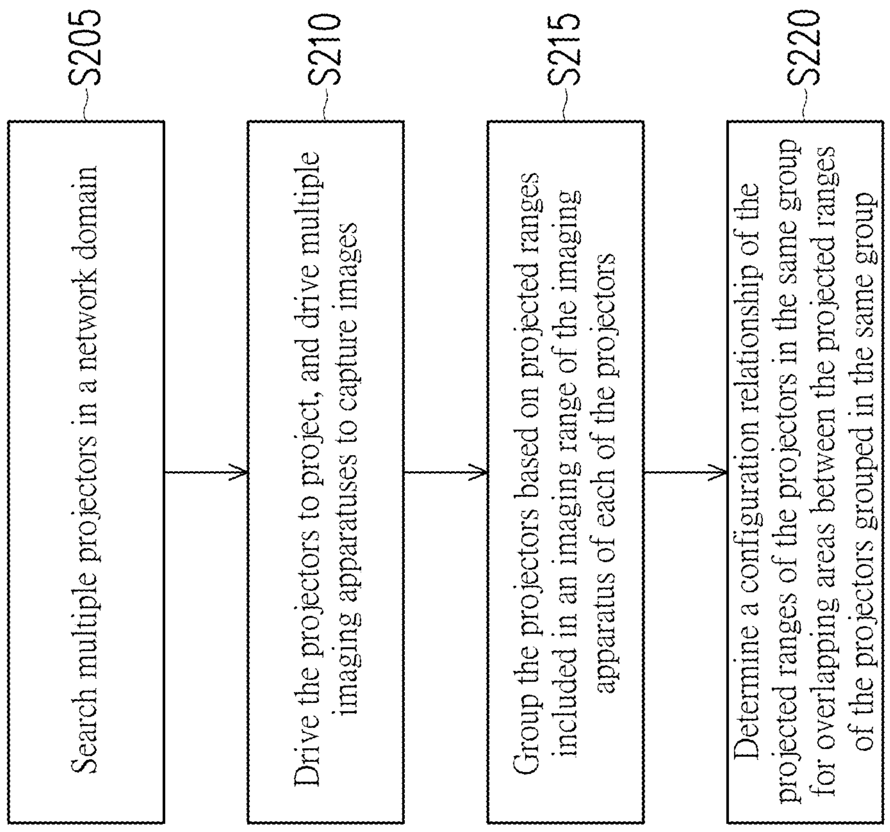
FIG. 2 is a flowchart of a method for automatically detecting a projector configuration according to an embodiment of the disclosure.

FIG. 2 is a flowchart of a method for automatically detecting a projector configuration according to an embodiment of the disclosure. Please refer to FIG. 1A and FIG. 2 at the same time. First, in Step S205, the processor 110 searches the projectors 120-1 to 120-N in the network domain. For example, the processor 110 may be used with an application. The application may provide a search page to be displayed on a display, so that a network domain to be searched may be selected through the search page, so as to find network addresses of all the projectors 120-1 to 120-N in the specified network domain.

Next, in Step S210, the processor 110 drives the projectors 120-1 to 120-N to project, and drives the imaging apparatuses 130-1 to 130-N to capture images. Afterwards, in Step S215, the processor 110 groups the projectors 120-1 to 120-N based on one or more projected ranges included in an imaging range of each of the imaging apparatus 130-1 to 130-N. In detail, the projectors 120-1 to 120-N are respectively disposed in different spaces or situations, and Step S215 is to find the projectors used together in the same space or situation to be defined as a group, and divide into multiple groups according to multiple projectors in different spaces or situations, that is, to group the projectors. For example, a group of one or more projectors in a conference room A may be found, a group of one or more projectors in a conference room B may be found, and so on. For example, in the same space, projector groups in different situations are used, such as projector groups located at different booths in an exhibition hall.

Here, the processor 110 may drive one or more of the projectors 120-1 to 120-N to project recognition images at one time, and drive one or more of the imaging apparatuses 130-1 to 130-N to capture images. Subsequently, based on obtained captured image, the respective projected ranges of the projectors 120-1 to 120-N may be calculated, and the projected ranges included in the imaging range of each of the imaging apparatuses 130-1 to 130-N may be obtained, thereby analyzing which projector the projected ranges included in the imaging range belong to. After obtaining the projected ranges included in the respective imaging ranges of the imaging apparatuses 130-1 to 130-N, the projectors 120-1 to 120-N may be further optionally grouped according to whether the projected ranges intersect (overlap).

Then, in Step S220, the processor 110 determines a configuration relationship of the projected ranges of the projectors in the same group based on overlapping areas between the projected ranges of the projectors grouped in the same group.

In detail, the key to the automatic grouping is to establish a correlation among the projectors 120-1 to 120-N. After finding all the projectors 120-1 to 120-N in the same network domain, the projectors 120-1 to 120-N are sequentially or simultaneously driven to project recognition images with the same or different patterns or identification information. For example, the recognition image includes at least one of a number, an alphabet, a color, a pattern, etc. The recognition images are projected to a projection surface by the projector 120-1 to 120-N, the captured image is obtained through the imaging apparatus 130-1 to 130-N, and the processor 110 then identifies the captured image via a manner of image processing and identification, so as to find the correlation among the projectors 120-1 to 120-N. Hereinafter, another embodiment is used to describe time points (time periods) of driving the projectors 120-1 to 120-N and the imaging apparatuses 130-1 to 130-N in detail.

In the following embodiments, N=11 is used for illustration, but not limited thereto. That is, it is assumed that projectors 120-1 to 120-11 (N=11) are included in the same network domain, and imaging apparatuses 130-1 to 130-11 (N=11) are disposed corresponding to the projectors 120-1 to 120-11. The projector 120-1 is correspondingly equipped with the imaging apparatus 130-1, the projector 120-2 is correspondingly equipped with the imaging apparatus 130-2, . . . , and the projector 120-11 is correspondingly equipped with the imaging apparatus 130-11. Moreover, the imaging range of the imaging apparatus 130-1 to 130-11 corresponding to each of the projectors 120-1 to 120-11 is greater than the projected range thereof. That is, the imaging range of the imaging apparatus 130-1 is greater than the projected range of the projector 120-1, the imaging range of the imaging apparatus 130-2 is greater than the projected range of the projector 120-2, . . . , and the imaging range of the imaging apparatus 130-11 is greater than the projected range of the projector 120-11.

Figure 3A:
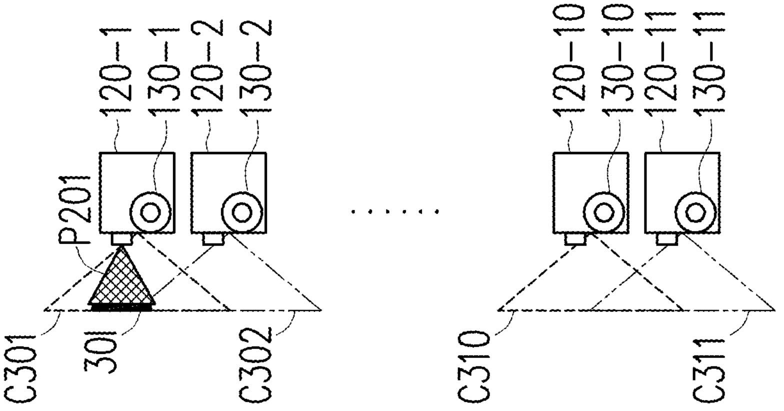
FIG. 3A to FIG. 3C are schematic diagrams illustrating an operation of driving a projector and an imaging apparatus according to a first embodiment of the disclosure.
Figure 3B:
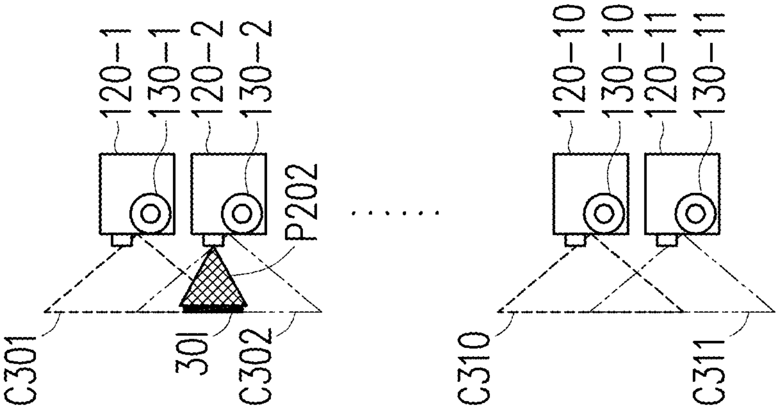
Figure 3C:
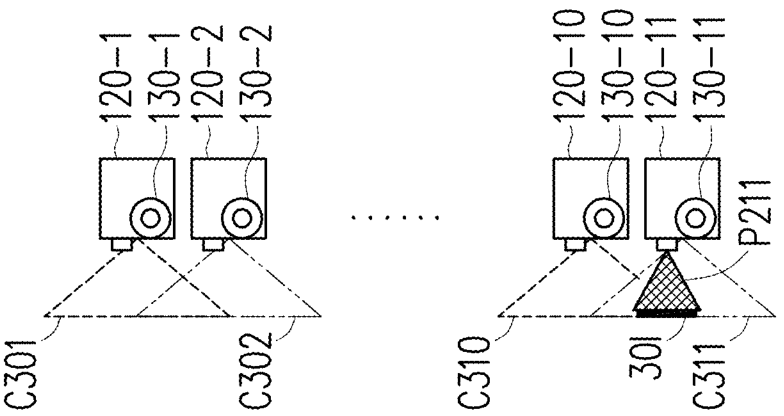

FIG. 3A to FIG. 3C are schematic diagrams illustrating an operation of driving a projector and an imaging apparatus according to a first embodiment of the disclosure. Please refer to FIG. 1A and FIG. 3A to FIG. 3C at the same time. In the first embodiment, the processor 110 sequentially drives an i-th projector among the projectors 120-1 to 120-11 to project a recognition image 30I, where i=1, 2, . . . , 11. In the case where the i-th projector projects the recognition image 30I, the imaging apparatuses 130-1 to 130-11 are driven to simultaneously or sequentially capture images. Also, in the case where the i-th projector projects the recognition image 30I, other projectors project black images or background images (in particular, the projector projecting the black image or the background image refers to a projector state that does not interfere with the recognition image, and in other embodiments, projecting the black image may also be implemented by manners such as turning off the projector, turning off a light source of the projector, and blocking a projection beam of the projector). After all the imaging apparatuses have captured images, another projector is driven to project the recognition image 30I until the projectors all perform the projecting step of the recognition image 30I. In particular, if an i-th imaging apparatus has previously confirmed the projected range of the i-th projector, in the case where the i-th projector projects the recognition image 30I, the corresponding i-th imaging apparatus does not need to capture an image.

In the first embodiment, since only one of the projectors 120-1 to 120-11 is driven to project each time, the processor 110 may clearly know which projector is the source of each projection. Accordingly, the projectors 120-1 to 120-11 may adopt the recognition image 30I having the same pattern.

Please refer to FIG. 3A to FIG. 3C. First, the projector 120-1 (a first projector) is driven to project the recognition image 30I, the other projectors 120-2 to 120-11 project the black images or the background images, and in the case where the projector 120-1 projects the recognition image 30I, the imaging apparatuses 130-1 to 130-11 are driven to simultaneously capture images (obtain 11 captured images). Next, the projector 120-2 (a second projector) is driven to project the recognition image 30I, the other projectors 120-1 and 120-3 to 120-11 project the black images or the background images, and in the case where the projector 120-2 projects the recognition image 30I, the imaging apparatuses 130-1 to 130-11 are driven to simultaneously capture images (obtain 11 captured images). The projectors 120-3 to 120-10 may be deduced by analogy. Finally, the projector 120-11 (an eleventh projector) is driven to project the recognition image 30I, the other projectors 120-1 to 120-10 project the black images or the background images, and in the case where the projector 120-11 projects the recognition image 30I, the imaging apparatuses 130-1 to 130-11 are driven to simultaneously capture images (obtain 11 captured images).

Afterwards, the processor 110 may further determine the projected range included in each imaging range according to 11 groups of captured images obtained (each group includes 11 captured images), so as to determine the correlation among the projectors 120-1 to 120-11.

Specifically, taking FIG. 3A as an example, based on the 11 captured images captured by the 11 imaging apparatuses 130-1 to 130-11 in the case where the projector 120-1 projects the recognition image 30I, whether imaging ranges C301 to C311 of the 11 imaging apparatuses 130-1 to 130-11 include a projected range P201 of the projector 120-1 is respectively determined. That is, whether the recognition image 30I projected by the projector 120-1 is captured in the respective captured images of the imaging apparatuses 130-1 to 130-11 is determined, so as to determine whether each of the imaging ranges C301 to C311 covers the projected range P201 of the projector 120-1. In the example shown in FIG. 3A, the imaging ranges C301 and C302 of the imaging apparatuses 130-1 and 130-2 both have the projected range P201. By analogy, whether each of the imaging ranges C301 to C311 covers projected ranges P202 to P211 is determined.

Each of the imaging ranges C301 to C311 at least includes the projected range of its own corresponding projector, and whether the projected ranges of other projectors are included may be further determined based on the above action.

Next, in response to an i-th imaging range of the i-th imaging apparatus including an i-th projected range and at least one other projected range, the processor 110 sets each projector corresponding to an individual at least one other projected range overlapping with the i-th projected range to have correlation with the i-th projector, and sets each projector corresponding to an individual other projected range not overlapping with the i-th projected range to have no correlation with the i-th projector.

That is, for the imaging range that includes multiple projected ranges, the processor 110 determines whether the projected ranges included in the imaging range overlap with the projected range of the corresponding projector, so as to determine that the projectors whose projected ranges overlap have correlation, and determine that the projectors whose projected ranges do not overlap have no correlation. For example, assuming that the imaging range C301 includes the projected ranges P201 and P202, if the projected range P201 overlaps with the projected range P202, the projector 120-1 having correlation with the projector 120-2 is determined. If the projected range P201 does not overlap with the projected range P202, the projector 120-1 not having correlation with the projector 120-2 is determined.

In addition, it is assumed that the imaging range C302 includes projected ranges P201 to P203, and the projected range P202 respectively overlaps with the projected range P201 and the projected range P203, but the projected range P201 does not overlap with the projected range P203. In this case, the projector 120-2 respectively has correlation (direct correlation) with the projectors 120-1 and 120-3 is determined. Moreover, although the projected range P201 does not overlap with the projected range P203, since the projector 120-1 has correlation with the projector 120-2, and the projector 120-2 has correlation with the projector 120-3, the projector 120-1 is determined to have indirect correlation with the projector 120-3 via the projector 120-2.

Then, the processor 110 groups according to the correlation among the projectors 120-1 to 120-11. For example, the projectors having direct or indirect correlation are set to the same group.

Figure 4B:
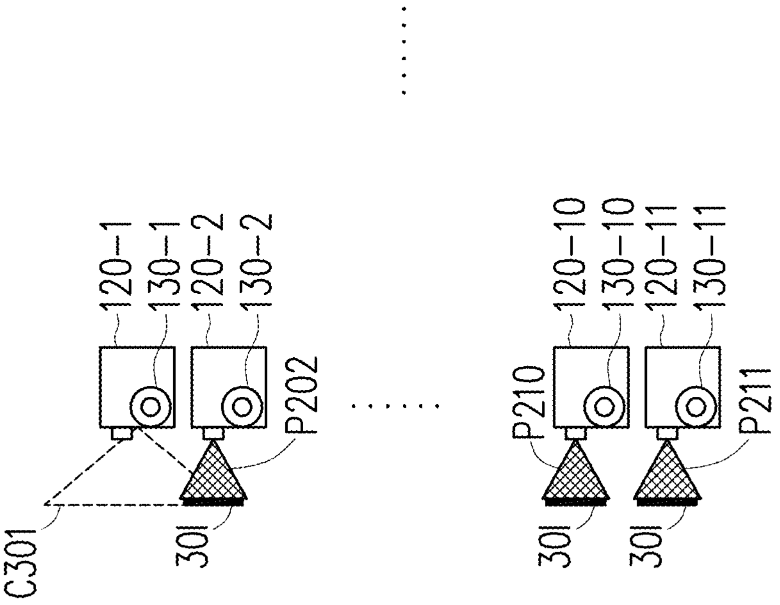
FIG. 4A and FIG. 4B are schematic diagrams illustrating an operation of driving a projector and an imaging apparatus according to a second embodiment of the disclosure.
Figure 4A:
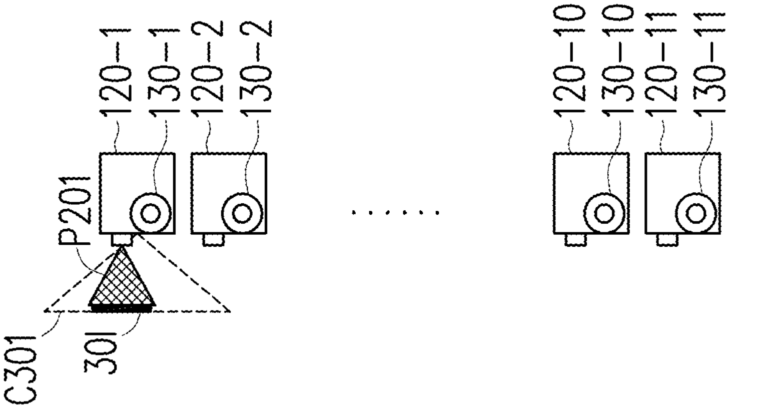

FIG. 4A and FIG. 4B are schematic diagrams illustrating an operation of driving a projector and an imaging apparatus according to a second embodiment of the disclosure. Please refer to FIG. 1A, FIG. 4A, and FIG. 4B at the same time. In the second embodiment, the processor 110 sequentially drives a j-th projector to project the recognition image 30I, and drives a j-th imaging apparatus corresponding to the j-th projector to capture an image, so as to obtain a first captured image, where j=1, 2, . . . , 11. Next, the processor 110 drives other 10 projectors except the j-th projector to simultaneously project the recognition image 30I, at this time, the j-th projector may project a black image or a background image, and drives the j-th imaging apparatus to capture an image, so as to obtain a second captured image.

In the second embodiment shown in FIG. 4A and FIG. 4B, there will be two projection steps and two imaging steps. That is, the first time is to drive a target (the j-th) projector to project, and drive a target (the j-th) imaging apparatus corresponding to the target projector to capture an image. The second time is to drive remaining non-target projectors to simultaneously project, and drive the target imaging apparatus to capture an image. Since each of the imaging apparatuses 130-1 to 130-11 captures images twice, in order to distinguish the sources of the recognition images 301 in different captured images, the recognition images 301 respectively projected by the projectors 120-1 to 120-11 have the identification information (for example, information such as projector numbers) of the corresponding source projectors.

Specifically, first, as shown in FIG. 4A, the projector 120-1 (the first projector) is driven to project the recognition image 30I, the other projectors 120-2 to 120-11 project the black or the background image, and the imaging apparatus 130-1 is driven to capture an image, so as to obtain the first captured image. Next, as shown in FIG. 4B, the projectors 120-2 to 120-11 except the projector 120-1 are driven to simultaneously project the recognition image 30I, the projector 120-1 projects the black image or the background image, and the imaging apparatus 130-1 is driven to capture an image, so as to obtain the second captured image. That is, the imaging apparatus 130-1 captures an image for the first time to obtain the first captured image when the projector 120-1 is projecting, and the imaging apparatus 130-1 further captures an image for the second time to obtain the second captured image when the projectors 120-2 to 120-11 are simultaneously projecting. By analogy, each of the imaging apparatuses 130-2 to 130-11 obtains the first captured image and the second captured image through capturing images twice.

Afterwards, the processor 110 determines the projected range of the corresponding projector based on the first captured image captured by each of the imaging apparatuses 130-1 to 130-11. Moreover, the processor 110 determines whether the imaging range includes the projected range of at least one of the other 10 projectors except the corresponding projector based on the second captured image captured by each of the imaging apparatuses 130-1 to 130-11 (that is, based on the second captured image captured by the j-th imaging apparatus). That is, the projected range included in each imaging range is determined, so as to determine the correlation among the projectors 120-1 to 120-11.

Afterwards, in response to the j-th imaging range including the projected range of at least one of the other 10 projectors, based on the first captured image and the second captured image captured by the j-th imaging apparatus, the processor 110 sets each projector corresponding to an individual other projected range overlapping with a j-th projected range of the j-th imaging apparatus to have correlation with the j-th projector, and sets each projector corresponding to an individual other projected range not overlapping with the j-th projected range to have no correlation with the j-th projector.

For example, in FIG. 4A, the projected range P201 of the projector 120-1 in the imaging range C301 of the imaging apparatus 130-1 may be determined based on the first captured image of the imaging apparatus 130-1. In FIG. 4B, the imaging range C301 also includes the projected range of the projector 120-2 may be determined based on the second captured image of the imaging apparatus 130-1. By analogy, the projected ranges included in each imaging range may be analyzed one by one. Afterwards, the projectors whose projected ranges overlap are set to have correlation, and the projectors whose projected ranges do not overlap have no correlation. Then, the processor 110 groups according to the correlation among the 11 projectors 120-1 to 120-11. For example, the projectors having direct or indirect correlation are set to the same group.

Figure 5:
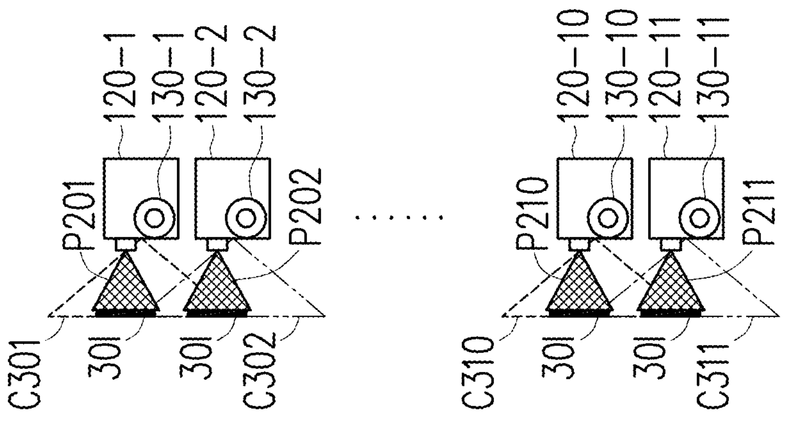
FIG. 5 is a schematic diagram illustrating an operation of driving a projector and an imaging apparatus according to a third embodiment of the disclosure.

FIG. 5 is a schematic diagram illustrating an operation of driving a projector and an imaging apparatus according to a third embodiment of the disclosure. Please refer to FIG. 1A and FIG. 5 at the same time. In the third embodiment, the processor 110 drives the projectors 120-1 to 120-11 to simultaneously respectively project the recognition images 301. That is, one projector projects one recognition image 30I, and the 11 projectors 120-1 to 120-11 project 11 recognition images 301 in total. In the case where the 11 projectors 120-1 to 120-11 all project the corresponding recognition images 301, the 11 imaging apparatuses 130-1 to 130-11 are driven to respectively capture images (simultaneously capture images or sequentially capture images), so as to obtain 11 captured images.

In the third embodiment shown in FIG. 5, since each of the imaging apparatuses 130-1 to 130-11 is driven to capture an image under the state where the projectors 120-1 to 120-11 are all projecting (simultaneously projecting) the recognition images 301, in order to easily distinguish the sources of the recognition images 301 in different captured images, the recognition images 301 respectively projected by the projectors 120-1 to 120-11 must have the identification information (for example, information such as projector numbers) of the corresponding source projectors, that is, the contents of the recognition images projected by different projectors are different.

Afterwards, the processor 110 respectively determines whether a k-th imaging range of a k-th imaging apparatus among the 11 imaging apparatuses 130-1 to 130-11 includes a k-th projected range of a k-th projector and the projected ranges of other projectors based on the 11 captured images, where k=1, 2, . . . , N. That is, each captured image obtained by the imaging apparatuses 130-1 to 130-11 is analyzed to determine which projected ranges are included in each imaging range. Afterwards, the projectors whose projected ranges overlap are set to have correlation, and the projectors whose projected ranges do not overlap have no correlation. Then, the processor 110 groups based on the correlation among the 11 projectors 120-1 to 120-11. For example, the projectors having direct or indirect correlation are set to the same group.

The timing of driving the projector and the imaging apparatus of the first to third embodiments are only examples for illustration and are not limited thereto.

After grouping ends, the processor 110 further determines the configuration relationship of the projected ranges of the projectors in each group. The configuration relationship includes one of a horizontal splicing configuration, a vertical splicing configuration, a stacking configuration, and a matrix splicing configuration.

Figure 6A:
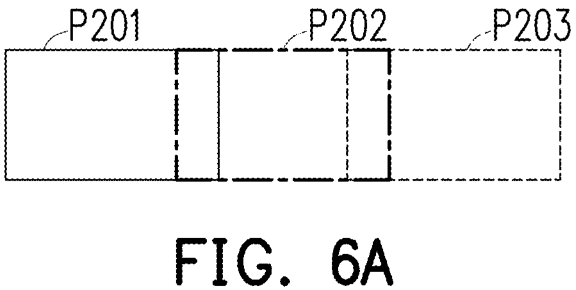
FIG. 6A to FIG. 6D are schematic diagrams of a configuration relationship according to an embodiment of the disclosure.
Figure 6B:
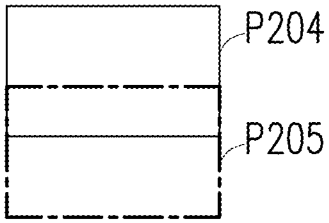
Figure 6C:
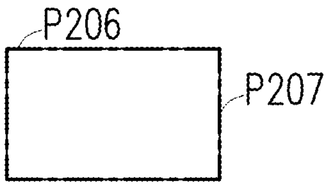
Figure 6D:
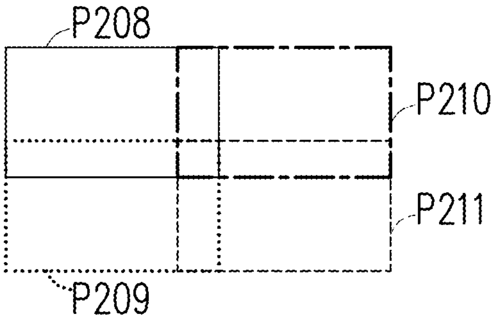

FIG. 6A to FIG. 6D are schematic diagrams of a configuration relationship according to an embodiment of the disclosure. FIG. 6A shows the horizontal splicing configuration, FIG. 6B shows the vertical splicing configuration, FIG. 6C shows the stacking configuration, and FIG. 6D shows the matrix splicing configuration.

FIG. 6A is illustrated by the projected ranges P201 to P203, FIG. 6B is illustrated by projected ranges P204 and P205, FIG. 6C is illustrated by projected ranges P206 and P207, and FIG. 6D is illustrated by projected ranges P208 to P211, but not limited thereto. In FIG. 6A, the projected ranges P201 and P202 adjacently overlap in the horizontal direction, and the projected ranges P202 and P203 adjacently overlap in the horizontal direction. In FIG. 6B, the projected ranges P204 and P205 adjacently overlap in the vertical direction. In FIG. 6C, the projected ranges P206 and P207 overlap in a stacking manner. In FIG. 6D, the projected ranges P208 to P211 overlap and are spliced in a 2×2 arrangement manner.

The technical contents of the determination of correlation and the recognition image (configuration relationship) will be respectively further explained as follows.

Figure 7A:
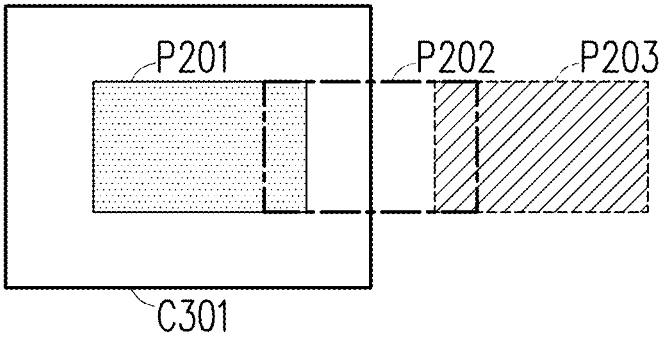
FIG. 7A to FIG. 7C are schematic diagrams of setting correlation according to an embodiment of the disclosure.
Figure 7B:
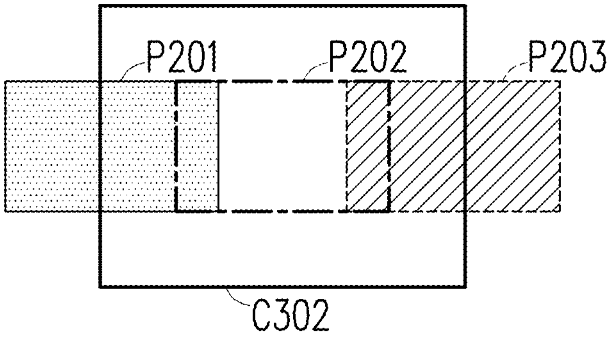
Figure 7C:
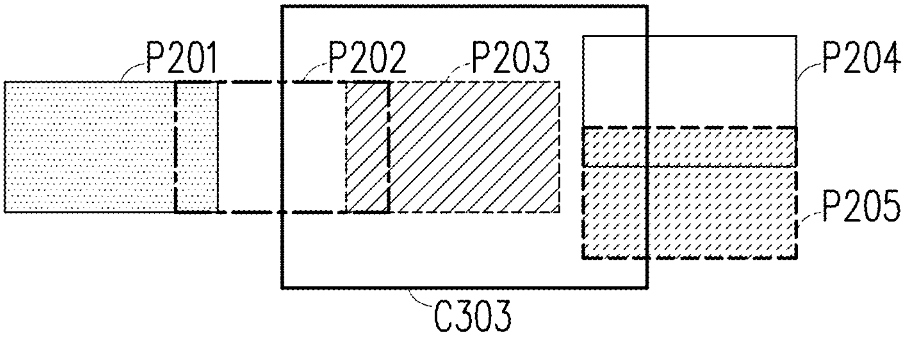

First, the determination of correlation will be described with different situations of FIG. 7A, FIG. 7B, or FIG. 7C. FIG. 7A to FIG. 7C are schematic diagrams of determining correlation according to an embodiment of the disclosure. The description will be made with the projected ranges P201 to P205 of the five projectors 120-1 to 120-5 and the imaging ranges C301 to C303 of the three imaging apparatuses 130-1 to 130-3.

After obtaining the corresponding captured images via the driving sequence of the projectors and the imaging apparatuses of FIG. 3A to FIG. 3C, FIG. 4A, FIG. 4B, or FIG. 5, the processor 110 may further analyze the projected ranges covered by the imaging ranges C301 to C303 via the driving sequence and information of the recognition images included in the captured images.

As shown in FIG. 7A, the processor 110 analyzes that the imaging range C301 of the imaging apparatus 130-1 includes the projected ranges P201 and P202, and the projected range P201 overlaps with the projected range P202. Accordingly, the projector 120-1 and the projector 120-2 corresponding to the imaging apparatus 130-1 having correlation is determined.

As shown in FIG. 7B, the processor 110 analyzes that the imaging range C302 of the imaging apparatus 130-2 includes the projected ranges P201, P202, and P203, and the projected range P201 overlaps with the projected range P202, the projected range P202 overlaps with the projected range P203, but the projected range P201 does not overlap with the projected range P203. Accordingly, the projector 120-2 and the projector 120-1 corresponding to the imaging apparatus 130-2 having correlation (direct correlation), and the projector 120-2 having correlation (direct correlation) with the projector 120-3 is determined. Furthermore, by the projector 120-2, the projector 120-1 also has correlation (indirect correlation) with the projector 120-3. Therefore, the projectors 120-1, 120-2, and 120-3 are grouped into the same group.

As shown in FIG. 7C, the processor 110 analyzes that the imaging range C303 of the imaging apparatus 130-3 includes the projected ranges P202, P203, P204, and P205, and the projected range P202 overlaps with the projected range P203, and the projected range P204 overlaps with the projected range P205. However, none of the projected ranges P204 and P205 overlap with or are adjacent to the projected ranges P202 and P203, so the projectors 120-2 and 120-3 not having correlation with the projectors 120-4 and 120-5 is determined. Therefore, the projector 102-3 is not grouped into the same group as the projectors 120-4 and 120-5.

Figure 8A:
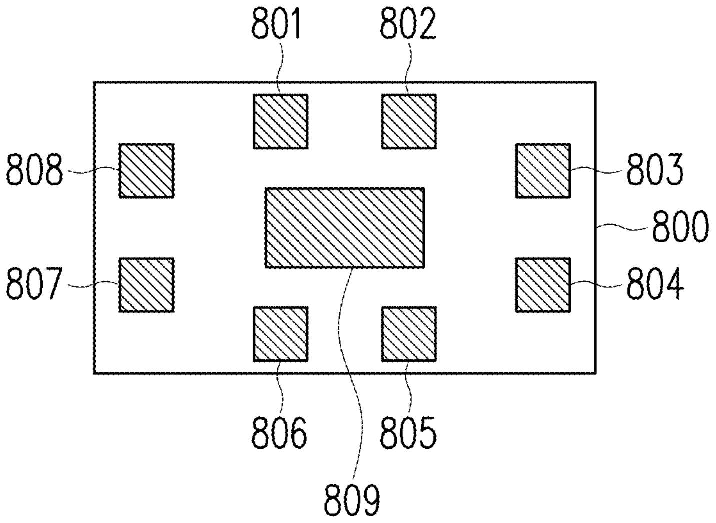
FIG. 8A and FIG. 8B are schematic diagrams of two recognition images according to an embodiment of the disclosure.
Figure 8B:
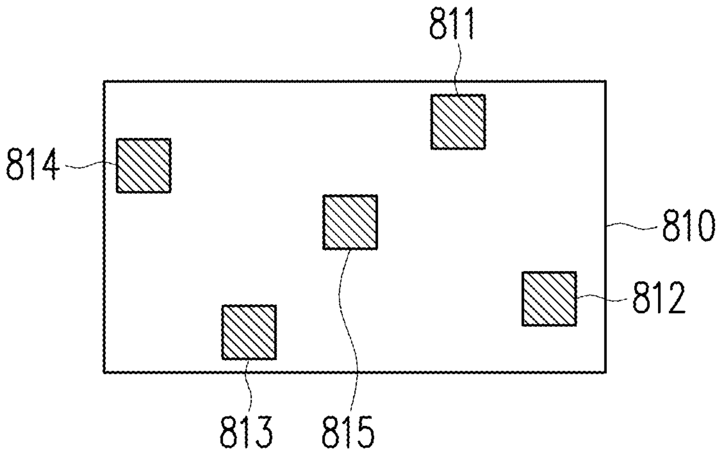

Next, the recognition images (configuration relationship) will be described with reference to FIG. 8A and FIG. 8B. FIG. 8A and FIG. 8B are schematic diagrams of two recognition images having identification information according to an embodiment of the disclosure. FIG. 8A and FIG. 8B are for illustration only and are not limited thereto.

A recognition image 800 of FIG. 8A includes image area information. The image area information is used to indicate positions and area content (pattern and/or identification information) of multiple areas 801 to 809 of the recognition image 800. The areas 801-809 are used to present arbitrary patterns and/or identification information. The pattern is, for example, a square, a circle, an ellipse, etc. The identification information is, for example, a number, a code, or an index value of a projector. In addition, in order to prevent the problem that in the case where projectors all project the recognition images 800, projected ranges of two projectors overlap and cause difficulty in pattern identification, in an embodiment, pattern features of the opposing areas 807 and 808 and areas 803 and 804 may be set to be different, and pattern features of the opposing areas 801 and 802 and areas 805 and 806 are set to be different. In this way, when determining a configuration relationship of the projected ranges of the projectors in the same group, the configuration relationship may be determined according to the image area information.

A recognition image 810 of FIG. 8B includes multiple areas 811 to 815, which may present arbitrary patterns or identification information. For example, index values representing projectors are displayed in the areas 811 to 815. In the recognition image 810, the positions of the areas 811 and 813 on the upper and lower sides and the area 815 in the center are staggered in the horizontal direction, and the positions of the areas 812 and 814 on the left and right sides and the area 815 in the center are staggered in the vertical direction. Accordingly, when the projectors all project the recognition images 810, the problem that the identification information in the projected recognition images 810 are interlaced and cause difficulty in recognition in the case where two adjacent projected ranges overlap can be prevented. In particular, if purely used for the determination of grouping, the recognition image may not contain an arbitrary pattern or identification information, such as a white image or a special color image.

In an embodiment, whether the recognition images projected by the projectors 120-1 to 120-11 are the same may be decided based on the driving sequence of the projectors 120-1 to 120-11 and the imaging apparatuses 130-1 to 130-11. For example, if the driving sequence of "separate projection and simultaneous or separate imaging" in the first embodiment is adopted, the recognition images projected by the projectors 120-1 to 120-11 may be the same. In addition, if the driving sequence of "simultaneous projection and separate or simultaneous imaging" in the second embodiment is adopted, the recognition images projected by the projectors 120-1 to 120-11 need to be different in order to determine the correlation among different projected ranges in one captured image.

The following further explains how to determine the configuration relationship of the projected ranges. The action of grouping the projectors is similar to the action of determining the configuration relationship of the projected ranges and may be achieved through driving sequence manners such as "separate projection and simultaneous imaging" or "simultaneous projection and separate imaging".

In an embodiment, the processor 110 may sequentially drive an m-th (m=1, 2, . . . , M) projector among M projectors included in the same group to project a reference image, and drive M imaging apparatuses included in the same group to simultaneously capture images in the case where the m-th projector projects the reference image. Then, the configuration relationship between the m-th projector and the M−1 other projectors is determined based on imaging results of the M imaging apparatuses. Here, the reference image is also similar to the recognition images 800 and 810 shown in FIG. 8A or FIG. 8B and includes at least one of a number, an alphabet, a color, and a pattern. Below is an example for illustration.

FIG. 9A to FIG. 9I are schematic diagrams of determining a configuration relationship of projected ranges according to an embodiment of the disclosure. FIG. 10A to FIG. 10C are schematic diagrams of a configuration relationship according to an embodiment of the disclosure. The embodiment is described by grouping the projectors 120-1, 120-2, and 120-3 (M=3) into the same group, but not limited thereto. In the embodiment, the processor 110 sequentially drives the projectors 120-1 to 120-3 included in the same group to project the reference images. Here, the reference image adopts an image similar to the recognition image 800 of FIG. 8A, and the reference image used in the embodiment includes 8 patterns for identification disposed in the areas 801 to 808, which are represented by dots here.

Figure 9A:
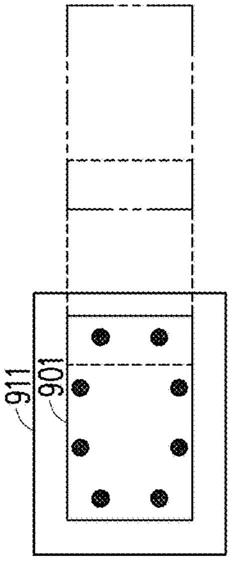
FIG. 9A to FIG. 9I are schematic diagrams of determining a configuration relationship of projected ranges according to an embodiment of the disclosure.
Figure 9B:
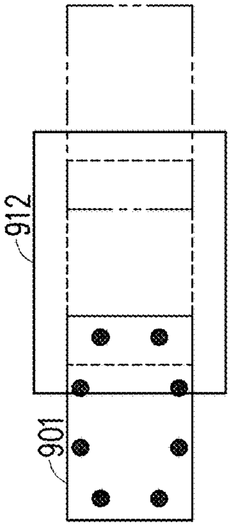
Figure 9C:
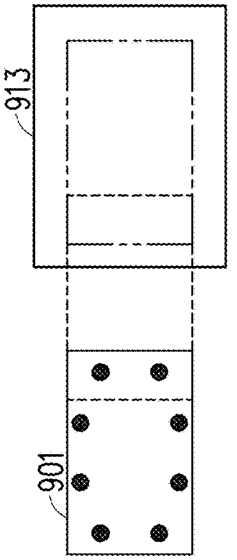
Figure 9D:
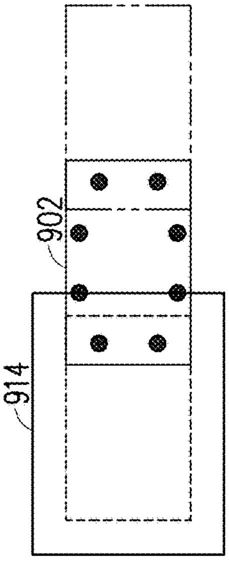
Figure 9E:
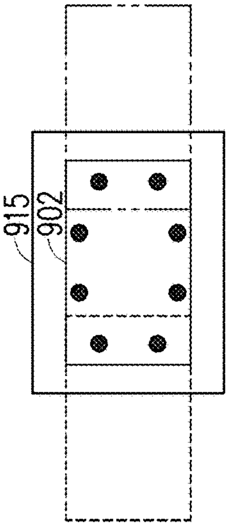
Figure 9F:
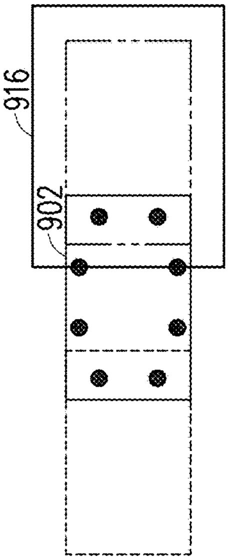
Figure 9G:
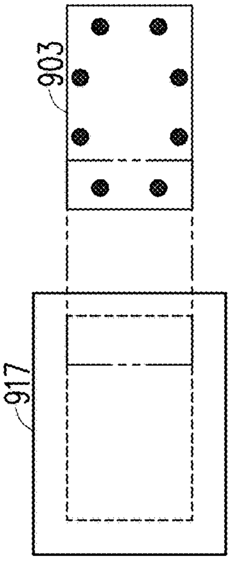
Figure 9H:
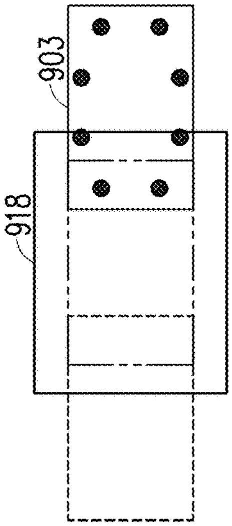
Figure 9I:
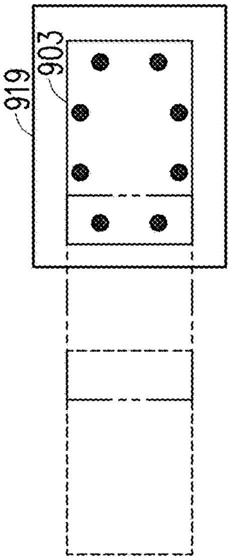
Figure 10A:
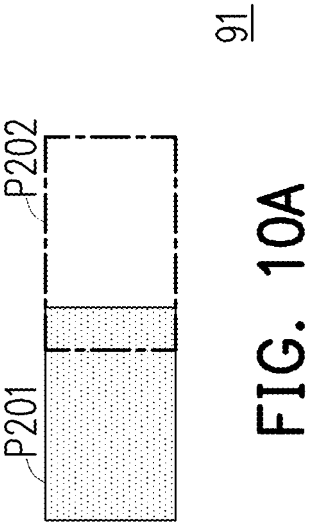
FIG. 10A to FIG. 10C are schematic diagrams of a configuration relationship according to an embodiment of the disclosure.
Figure 10B:
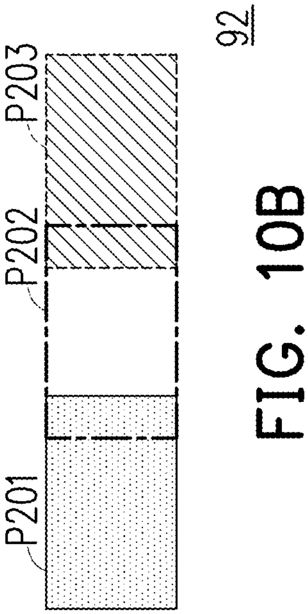
Figure 10C:
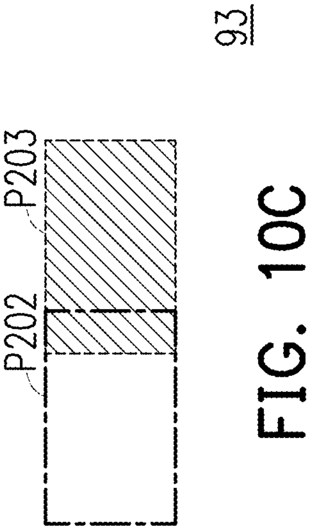

FIG. 9A to FIG. 9C show captured images 911 to 913 obtained by respectively driving the imaging apparatuses 130-1 to 130-3 to capture images in the case where the projector 120-1 is driven to project a reference image 901, and the projectors 120-2 and 120-3 project black images. FIG. 9D to FIG. 9F show captured images 914 to 916 obtained by respectively driving the imaging apparatuses 130-1 to 130-3 to capture images in the case where the projector 120-2 is driven to project a reference image 902, and the projectors 120-1 and 120-3 project black images. FIG. 9G to FIG. 9I show captured images 917 to 919 obtained by respectively driving the imaging apparatuses 130-1 to 130-3 to capture images in the case where the projector 120-3 is driven to project a reference image 903, and the projectors 120-1 and 120-2 project black images.

Based on the captured images 911, 914, and 917 and identification patterns of the reference images 901 and 902, the projected ranges P201 and P202 of the projector 120-1 and the projector 120-2 may be confirmed to have a configuration relationship 91 shown in FIG. 10A. Based on the captured images 912, 915, and 918 and identification patterns of the reference images 901, 902, and 903, the projected ranges P201 to P203 of the projectors 120-1 to 120-3 may be confirmed to have a configuration relationship 92 shown in FIG. 10B. Based on the captured images 913, 916, and 919 and identification patterns of the reference images 902 and 903, the projected ranges P202 and P203 of the projector 120-2 and the projector 120-3 may be confirmed to have a configuration relationship 93 shown in FIG. 10C.

In addition, in other embodiments, the processor 110 drives all the projectors included in the same group to respectively project multiple reference images having different patterns. In the case where the projectors all project one corresponding reference image, all the imaging apparatuses included in the same group are driven to respectively capture images, so as to obtain multiple captured images (corresponding to the number of the imaging apparatuses, that is, one imaging apparatus obtains one captured image). Afterwards, based on the captured images, the configuration relationship among all the projectors included in the same group is determined.

In addition, in other embodiments, the processor 110 may also complete the grouping and the confirmation of the configuration relationship at the same time. That is, all the projectors 120-1 to 120-11 are driven to respectively project recognition images having different patterns, and each of the imaging apparatuses 130-1 to 130-11 is driven to capture an image, so as to obtain 11 captured images. Here, 11 recognition images are used for the projectors 120-1 to 120-11 to respectively project. The identification image projected by each projector includes a pattern or identification information related to itself, so that the processor 110 may identify the source of each projected range for the captured image. After confirming the grouping of the projectors 120-1 to 120-11, the processor 110 further identifies one or more of the patterns included in overlapping areas between the projected ranges of all the projectors in the same group based on the 11 captured images, so as to obtain identification results. Based on the recognition results, the configuration relationship among all the projectors in the same group is determined.

Below is an example to illustrate how to complete the grouping and the confirmation of the configuration relationship at the same time. FIG. 11A to FIG. 11D are schematic diagrams of projector grouping and a configuration relationship according to an embodiment of the disclosure. Please refer to FIG. 1B and FIG. 11A to FIG. 11D. In the embodiment, the central control apparatus 100C is disposed to detect the configuration of the projectors 120-1 to 120-11. The processor 110 shown in FIG. 1 is disposed in the central control apparatus 100C. The projectors 120-1 to 120-11 are respectively correspondingly equipped with the imaging apparatuses 130-1 to 130-11.

The projectors 120-1 to 120-11 respectively project recognition images 1101 to 1111 having different patterns, as shown in FIG. 11A to FIG. 11D, the recognition images 1101 to 1111, for example, adopt images similar to the recognition image 810 of FIG. 8B, and the recognition images respectively have patterns related to corresponding projectors, for example, respectively have identification information of patterns "1" to "11" corresponding to different projectors. In the case where the projectors 120-1 to 120-11 all project the recognition images 1101 to 1111, the imaging apparatuses 130-1 to 130-11 are respectively driven to capture images, so as to obtain 11 captured images. Afterwards, the processor 110 identifies a boundary of the projected range included in each captured image via image recognition technology, and identifies the patterns "1" to "11" included in each captured image to determine projected ranges of which projectors are included in each imaging range, thereby grouping the projectors 120-1 to 120-11 and determining the configuration relationship of each group, as shown in FIG. 11A to FIG. 11D.

Figure 11A:
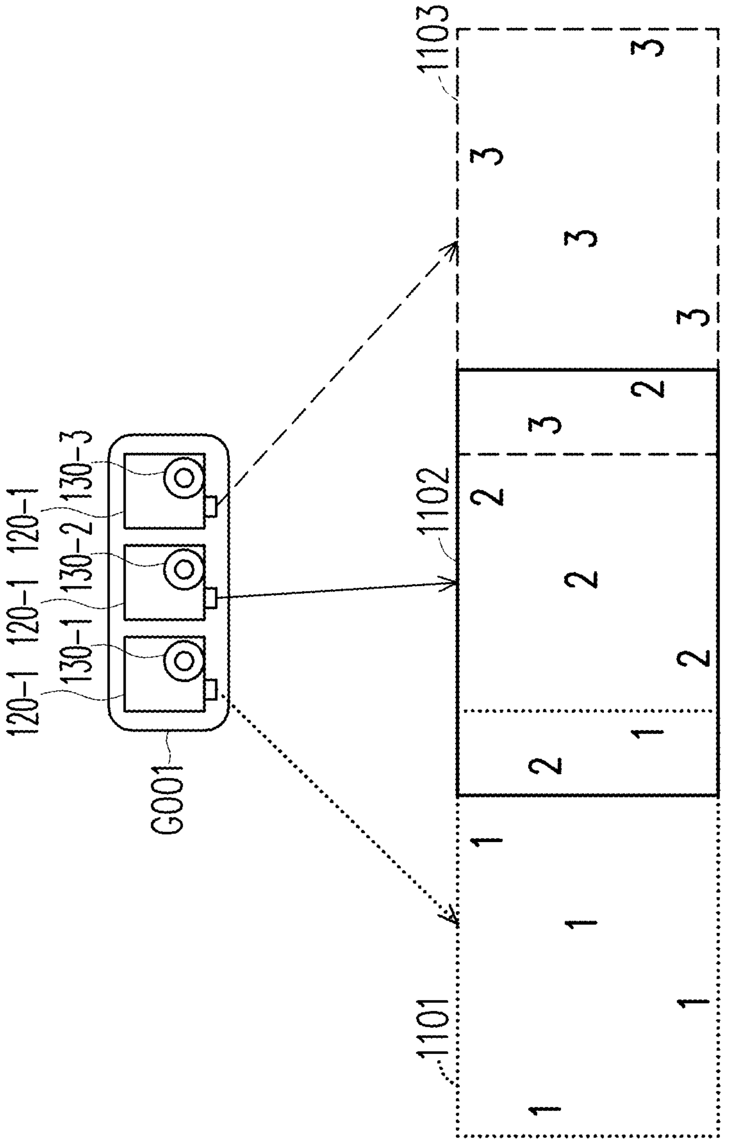
FIG. 11A to FIG. 11D are schematic diagrams of projector grouping and a configuration relationship according to an embodiment of the disclosure.
Figure 11B:
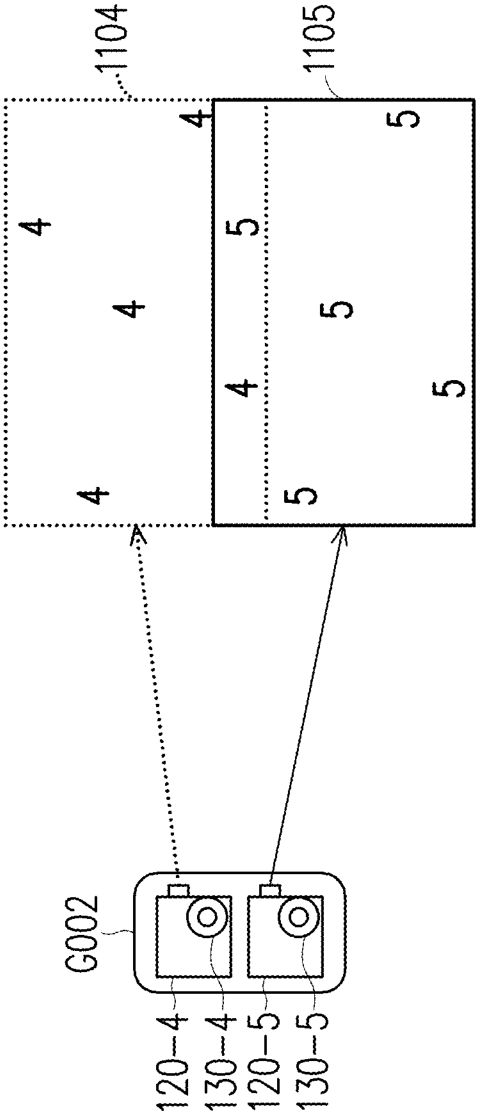
Figure 11C:
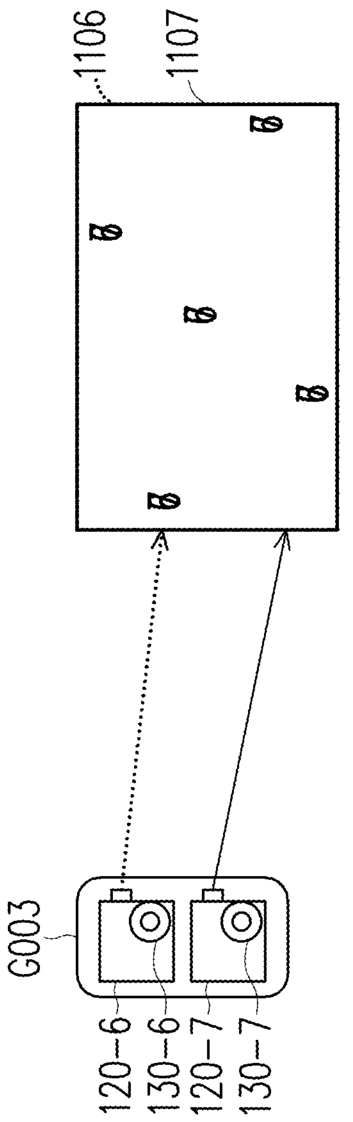
Figure 11D:
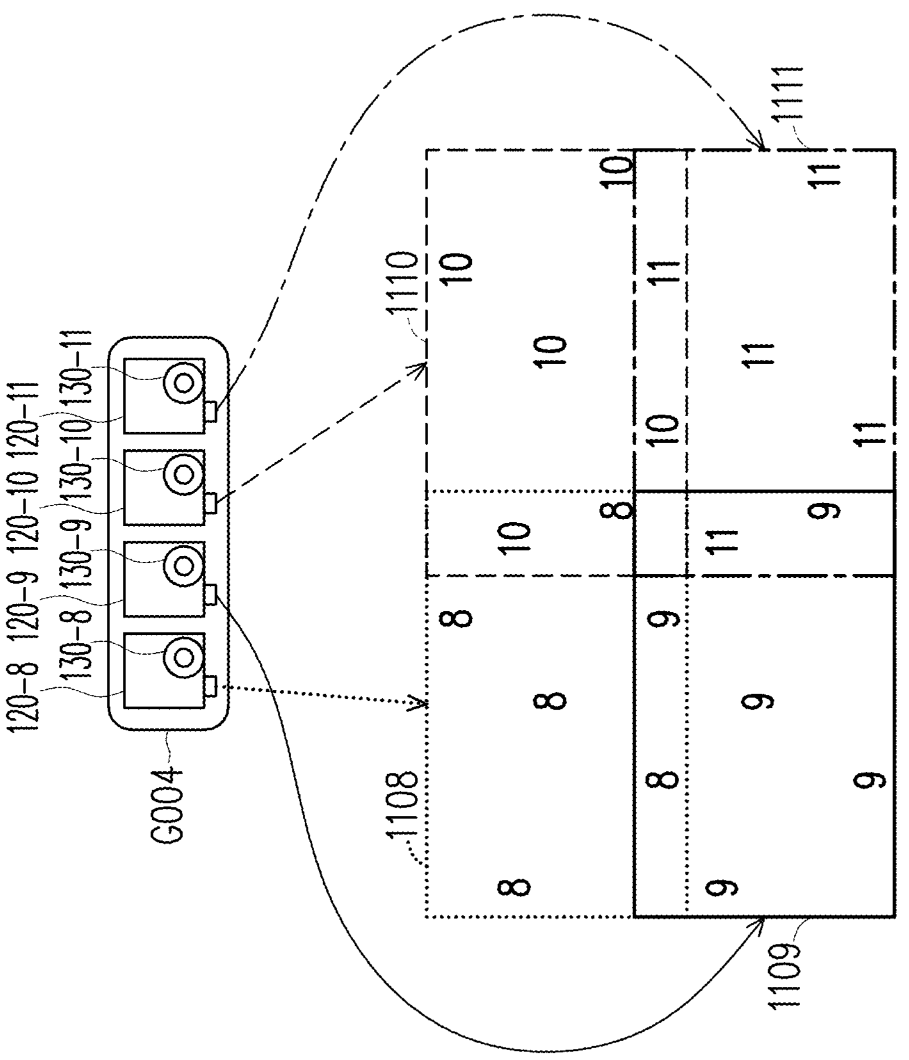

In FIG. 11A, the projectors 120-1 to 120-3 are grouped into a first group G001, and the configuration relationship is the horizontal splicing configuration. In FIG. 11B, the projectors 120-4 and 120-5 are grouped into a second group G002, and the configuration relationship is the vertical splicing configuration. In FIG. 11C, the projectors 120-6 and 120-7 are grouped into a third group G003, and the configuration relationship is the stacking configuration. In FIG. 11D, the projectors 120-8 to 120-11 are grouped into a fourth group G004, and the configuration relationship is the matrix splicing configuration.

FIG. 12 is a schematic diagram of a projector grouping result according to an embodiment of the disclosure. Please refer to FIG. 12. After the processor 110 searches the projectors 120-1 to 120-11 (the corresponding numbers are respectively 001 to 011) in the same network domain, a list 1201 may be displayed on the display for a user to view. After confirming that the projectors 120-1 to 120-11 are grouped into four groups, group lists 1211 to 1214 corresponding to the first group G001 to the fourth group G004 may be provided to the display for the user to view.

In summary, the disclosure can automatically detect the grouping of the projectors and the configuration relationship of the projected ranges. The disclosure may be implemented through an application, which may be automatically performed by adopting one button, so as to save multiple operation actions, thereby improving the operating experience of the user. Moreover, the disclosure may be applied to a remote control, the operation of the projector and the imaging apparatus thereof is remotely driven through the central control apparatus, and the captured image obtained by each imaging apparatus is received, thereby performing computations such as image processing and recognition on the captured image, thereby achieving automatic grouping and establishment of the configuration relationship. In addition, the disclosure may also be applied to an on-screen display (OSD). The processor is disposed in one of the projectors, and the projector may issue a command to drive the operation of the projector and the imaging apparatus thereof, so as to automatically detect the grouping and the configuration relationship of the projectors.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A method for automatically detecting a projector configuration, comprising:

searching for a plurality of projectors in a network domain, wherein each of the projectors is correspondingly equipped with an imaging apparatus;

driving the projectors to project, and driving the imaging apparatuses to capture images;

grouping the projectors based on one or more projected ranges comprised in an imaging range of the imaging apparatus of each of the projectors; and determining a configuration relationship of the projected ranges of the projectors in a same group for overlapping areas between the projected ranges of the projectors grouped in the same group, wherein a union of the projectors whose projected ranges overlap is set to have correlation, the projectors whose the projected ranges do not overlap have no correlation, and the union of the projectors having correlation is set to the same group.

2. The method for automatically detecting the projector configuration according to claim 1, wherein the imaging range of the imaging apparatus corresponding to each of the projectors is greater than a projected range of a corresponding one of the projectors, the network domain comprises N projectors and N imaging apparatuses, and step of driving the projectors to project, and driving the imaging apparatuses to capture images comprises:

sequentially driving an i-th projector among the N projectors to project a recognition image, where i=1, 2, . . . , N; and driving the N imaging apparatuses to simultaneously capture images in a case where the i-th projector projects the recognition image.

3. The method for automatically detecting the projector configuration according to claim 2, wherein step of grouping the projectors based on the projected ranges comprised in the imaging range of the imaging apparatus of each of the projectors comprises:

determining whether the respective imaging ranges of the N imaging apparatuses comprise an i-th projected range of the i-th projector based on N captured images captured by the N imaging apparatuses in the case where the i-th projector projects the recognition image, and identifying at least one projected range covered by each of N imaging ranges of the N imaging apparatuses, wherein the i-th projector is correspondingly equipped with an i-th imaging apparatus;

in response to an i-th imaging range of the i-th imaging apparatus comprising the i-th projected range and at least one other projected range, setting each projector corresponding to an individual other projected range overlapping with the i-th projected range to have direct correlation with the i-th projector, and setting each projector corresponding to an individual other projected range not overlapping with the i-th projected range to have no correlation with the i-th projector;

unioning the projectors that have direct correlation to form the union of the projectors; and grouping the union of the projectors among the N projectors.

4. The method for automatically detecting the projector configuration according to claim 1, wherein the imaging range of the imaging apparatus corresponding to each of the projectors is greater than a projected range of a corresponding one of the projectors, the network domain comprises N projectors and N imaging apparatuses, and step of driving the projectors to project, and driving the imaging apparatuses to capture images comprises:

driving a j-th projector among the projectors to project a recognition image, and driving a j-th imaging apparatus corresponding to the j-th projector among the imaging apparatuses to capture an image to obtain a first captured image, where j=1, 2, . . . , N; and driving N−1 other projectors except the j-th projector among the projectors to project the recognition image, and driving the j-th imaging apparatus to capture an image to obtain a second captured image.

5. The method for automatically detecting the projector configuration according to claim 4, wherein step of grouping the projectors based on the projected ranges comprised in the imaging range of the imaging apparatus of each of the projectors comprises:

determining whether a j-th imaging range of the j-th imaging apparatus comprises a projected range of at least one of the N−1 other projectors except the j-th projector based on the second captured image captured by the j-th imaging apparatus;

in response to the j-th imaging range comprising the projected range of the at least one of the N−1 other projectors, setting each projector corresponding to an individual other projected range overlapping with a j-th projected range of the j-th imaging apparatus to have direct correlation with the j-th projector, and setting each projector corresponding to an individual other projected range not overlapping with the j-th projected range to have no correlation with the j-th projector based on the first captured image and the second captured image captured by the j-th imaging apparatus;

unioning the projectors that have direct correlation to form the union of the projectors; and grouping the union of the projectors among the N projectors.

6. The method for automatically detecting the projector configuration according to claim 1, wherein the imaging range of the imaging apparatus corresponding to each of the projectors is greater than a projected range of a corresponding one of the projectors, the network domain comprises N projectors and N imaging apparatuses, and step of driving the projectors to project, and driving the imaging apparatuses to capture images comprises:

driving the N projectors to respectively project a plurality of recognition images; and driving the N imaging apparatuses to respectively capture images in a case where the N projectors all project a corresponding one of the recognition images to obtain N captured images.

7. The method for automatically detecting the projector configuration according to claim 6, wherein step of grouping the projectors based on the projected ranges comprised in the imaging range of the imaging apparatus of each of the projectors comprises:

respectively determining whether a k-th imaging range of a k-th imaging apparatus among the N imaging apparatuses comprises a k-th projected range of a k-th projector and a projected range of another projector based on the N captured images, where k=1, 2, . . . , N, wherein the k- th projector is correspondingly equipped with the k-th imaging apparatus;

in response to the k-th imaging range comprising the k-th projected range and at least one other projected range, setting each projector corresponding to an individual other projected range overlapping with the k-th projected range to have direct correlation with the k-th projector, and setting each projector corresponding to an individual other projected range not overlapping with the k-th projected range to have no correlation with the k-th projector;

unioning the projectors that have direct correlation to form the union of the projectors; and grouping the union of the projectors among the N projectors.

8. The method for automatically detecting the projector configuration according to claim 7, wherein the recognition images respectively have patterns related to corresponding projectors, step of determining the configuration relationship of the projected ranges of the projectors in the same group for the overlapping areas between the projected ranges of the projectors grouped in the same group comprises:

identifying one or more of the patterns comprised in the overlapping areas between the projected ranges of the projectors in the same group based on the N captured images to obtain an identification result; and determining the configuration relationship among the projectors in the same group based on the identification result.

9. The method for automatically detecting the projector configuration according to claim 1, wherein step of determining the configuration relationship of the projected ranges of the projectors in the same group for the overlapping areas between the projected ranges of the projectors grouped in the same group comprises:

sequentially driving an m-th projector among M projectors comprised in the same group to project a reference image, where m=1, 2, . . . , M;

driving M imaging apparatuses corresponding to the M projectors to simultaneously capture images in a case where the m-th projector projects the reference image; and determining the configuration relationship between the m-th projector and M−1 other projectors based on imaging results of the M imaging apparatuses.

10. The method for automatically detecting the projector configuration according to claim 1, wherein step of determining the configuration relationship of the projected ranges of the projectors in the same group for the overlapping areas between the projected ranges of the projectors grouped in the same group comprises:

driving M projectors comprised in the same group to respectively project a plurality of reference images having different patterns;

driving M imaging apparatuses corresponding to the M projectors to respectively capture images in a case where the M projectors all project a corresponding one of the reference images to obtain M captured images; and determining the configuration relationship among each of the M projectors and other projectors based on the M captured images.

11. The method for automatically detecting the projector configuration according to claim 1, wherein the configuration relationship comprises one of a horizontal splicing configuration, a vertical splicing configuration, a stacking configuration, and a matrix splicing configuration.

12. The method for automatically detecting the projector configuration according to claim 1, wherein the projectors respectively project a recognition image having a same or different pattern, or the projectors respectively project a recognition image having identification information related to the corresponding projector.

13. The method for automatically detecting the projector configuration according to claim 1, wherein a recognition image respectively projected by the projectors has image area information corresponding to an image area of the recognition image, and step of determining the configuration relationship of the projected ranges of the projectors in the same group comprises: determining the configuration relationship according to the image area information.

14. A projection system, comprising:

a plurality of projectors, disposed in a network domain;

a plurality of imaging apparatuses, wherein each of the projectors is correspondingly equipped with an imaging apparatus; and a processor, coupled to the projectors and the imaging apparatuses, and configured to:

search the projectors in the network domain;

drive the projectors to project, and drive the imaging apparatuses to capture images;

group the projectors based on one or more projected ranges comprised in an imaging range of the imaging apparatus of each of the projectors; and determine a configuration relationship of the projected ranges of the projectors in a same group for overlapping areas between the projected ranges of the projectors grouped in the same group, wherein a union of the projectors whose the projected ranges overlap is set to have correlation, the projectors whose projected ranges do not overlap have no correlation, and the union of the projectors having correlation is set to the same group.

15. The projection system according to claim 14, wherein the imaging range of the imaging apparatus corresponding to each of the projectors is greater than a projected range of a corresponding one of the projectors, the network domain comprises N projectors and N imaging apparatuses, and the processor is configured to:

sequentially drive an i-th projector among the N projectors to project a recognition image, where i=1, 2, . . . , N;

drive the N imaging apparatuses to capture images in a case where the i-th projector projects the recognition image, wherein the i-th projector is correspondingly equipped with an i-th imaging apparatus;

determine whether the respective imaging ranges of the N imaging apparatuses comprise an i-th projected range of the i-th projector based on N captured images captured by the N imaging apparatuses in the case where the i-th projector projects the recognition image, and identify at least one projected range covered by each of N imaging ranges of the N imaging apparatuses;

in response to an i-th imaging range of the i-th imaging apparatus comprising the i-th projected range and at least one other projected range, set each projector corresponding to an individual other projected range overlapping with the i-th projected range to have direct correlation with the i-th projector, and set each projector corresponding to an individual other projected range not overlapping with the i-th projected range to have no correlation with the i-th projector;

union the projectors that have direct correlation to form the union of the projectors; and group the union of the projectors among the N projectors.

16. The projection system according to claim 14, wherein the imaging range of the imaging apparatus corresponding to each of the projectors is greater than a projected range of a corresponding one of the projectors, the network domain comprises N projectors and N imaging apparatuses, and the processor is configured to:

drive a j-th projector among the projectors to project a recognition image, and drive a j-th imaging apparatus corresponding to the j-th projector among the imaging apparatuses to capture an image to obtain a first captured image, where j=1, 2, . . . , N;

drive N−1 other projectors except the j-th projector among the projectors to project the recognition image, and drive the j-th imaging apparatus to capture an image to obtain a second captured image;

determine whether a j-th imaging range of the j-th imaging apparatus comprises a projected range of at least one of the N-1 other projectors except the j-th projector based on the second captured image captured by the j-th imaging apparatus;

in response to the j-th imaging range comprising the projected range of the at least one of the N-1 other projectors, set each projector corresponding to an individual other projected range overlapping with a j-th projected range of the j-th imaging apparatus to have direct correlation with the j-th projector, and set each projector corresponding to an individual other projected range not overlapping with the j-th projected range to have no correlation with the j-th projector based on the first captured image and the second captured image captured by the j-th imaging apparatus;

union the projectors that have direct correlation to form the union of the projectors; and group the union of the projectors among the N projectors.

17. The projection system according to claim 14, wherein the imaging range of the imaging apparatus corresponding to each of the projectors is greater than a projected range of a corresponding one of the projectors, the network domain comprises N projectors and N imaging apparatuses, and the processor is configured to:

drive the N projectors to respectively project a plurality of recognition images;

drive the N imaging apparatuses to respectively capture images in a case where the N projectors all project a corresponding one of the recognition images to obtain N captured images;

respectively determine whether a k-th imaging range of a k-th imaging apparatus among the N imaging apparatuses comprises a k-th projected range of a k-th projector and a projected range of another projector based on the N captured images, where k=1, 2, . . . , N, wherein the k- th projector is correspondingly equipped with the k-th imaging apparatus;

in response to the k-th imaging range comprising the k-th projected range and at least one other projected range, set each projector corresponding to an individual other projected range overlapping with the k-th projected range to have direct correlation with the k-th projector, and set each projector corresponding to an individual other projected range not overlapping with the k-th projected range to have no correlation with the k-th projector;

union the projectors that have direct correlation to form the union of the projectors; and group the union of the projectors among the N projectors.

18. The projection system according to claim 17, wherein the recognition images respectively have patterns related to corresponding projectors, and the processor is configured to:

identify one or more of the patterns comprised in the overlapping areas between the projected ranges of the projectors in the same group based on the N captured images to obtain an identification result; and determine the configuration relationship among the projectors in the same group based on the identification result.

19. The projection system according to claim 14, wherein the processor is configured to:

sequentially drive an m-th projector among M projectors comprised in the same group to project a reference image, where m=1, 2, . . . , M;

drive M imaging apparatuses corresponding to the M projectors to simultaneously capture images in a case where the m-th projector projects the reference image; and determine the configuration relationship between the m-th projector and M-1 other projectors based on imaging results of the M imaging apparatuses.

20. The projection system according to claim 14, wherein the processor is configured to:

drive M projectors comprised in the same group to respectively project a plurality of reference images having different patterns;

drive M imaging apparatuses corresponding to the M projectors to respectively capture images in a case where the M projectors all project a corresponding one of the reference images to obtain M captured images; and determine the configuration relationship among each of the M projectors and other projectors based on the M captured images.

* * * * *